United States Patent [19]

Markbreiter et al.

[11] Patent Number: 4,704,146
[45] Date of Patent: Nov. 3, 1987

[54] LIQUID CARBON DIOXIDE RECOVERY FROM GAS MIXTURES WITH METHANE

[75] Inventors: Stephen J. Markbreiter, Edison, N.J.; Irving Weiss, Merrick, N.Y.

[73] Assignee: Kryos Energy Inc., New York, N.Y.

[21] Appl. No.: 891,343

[22] Filed: Jul. 31, 1986

[51] Int. Cl.⁴ ............................................. F25J 3/00
[52] U.S. Cl. ........................................... 62/17; 55/68; 62/24; 62/28; 62/32; 62/42
[58] Field of Search ............... 62/11, 17, 23, 24, 27, 62/28, 32, 36, 42; 55/68

[56] References Cited

U.S. PATENT DOCUMENTS

| | | | |
|---|---|---|---|
| 3,130,026 | 4/1964 | Becker | 62/17 |
| 3,453,835 | 7/1969 | Hochgesand | 62/17 |
| 3,516,261 | 6/1970 | Hoffman | 62/38 |
| 3,640,052 | 2/1972 | Konoki et al. | 55/68 |
| 3,977,203 | 8/1976 | Hinton et al. | 62/17 |
| 4,252,548 | 2/1981 | Markbreiter et al. | 62/17 |

Primary Examiner—Ronald C. Capossela
Attorney, Agent, or Firm—Paul W. Garbo

[57] ABSTRACT

Land-fill and other gases containing principally methane and carbon dioxide have been separated into high BTU fuel gas and discard carbon dioxide containing appreciable methane. Such discard gas can now be simply fractionated into high-purity liquid carbon dioxide with recoveries in excess of 80% while using a single refrigerant at a single low temperature to satisfy all refrigeration requirements of fractionation. This novel fractionation is ideally combined with the process of separating land-fill gas into high BTU fuel gas because then the methane and carbon dioxide are recovered completely as two valuable products, high BTU fuel gas and pure liquid carbon dioxide.

14 Claims, 2 Drawing Figures

LIQUID CARBON DIOXIDE RECOVERY FROM GAS MIXTURES WITH METHANE

BACKGROUND OF THE INVENTION

In recent years there has been a growing demand for carbon dioxide ($CO_2$) while economic sources have remained relatively limited. A significant contributor to the increased consumption of $CO_2$ is the expanding sales of carbonated beverages including "light beers". While refrigeration is the leading use of $CO_2$, the chemical and metal industries are important buyers of $CO_2$. The injection of $CO_2$ into wells for enhanced oil recovery is a modern development requiring large quantities of $CO_2$.

Ammonia plants are estimated to provide by-product $CO_2$ equivalent to about 70% of the demand for purified $CO_2$. Hence, when the sales of ammonia decline, the problem of supplying the users of $CO_2$ becomes acute.

Accordingly, a principal object of this invention is to open up a new source of $CO_2$ heretofore untapped, especially land-fill gas.

Another important object is to provide an economically attractive process for purifying the $CO_2$ from such new source.

A further object is to achieve very high recoveries of methane and purified $CO_2$ from land-fill gas or like gas mixtures of methane and $CO_2$.

Those and other objects and advantages of the invention will be evident from the description which follows.

SUMMARY OF THE INVENTION

In accordance with this invention, a by-product or discard gas mixture of at least 90% by volume $CO_2$ and at least 2% by volume methane is compressed to a pressure in the range of about 225 to 275 pounds per square inch absolute (psia), chilled to effect partial liquefaction of the gas mixture and fractionated to yield a column bottom liquid product containing not less than about 99.5% $CO_2$, preferably not less than 99.9% $CO_2$, on a molar basis.

The column top product is a gas mixture of substantially all the methane entering the column and not more than 20% of the $CO_2$ entering the column. In other words, the fractionation achieves a $CO_2$ recovery of at least 80% as purified liquid.

Traces of other gases which may be present in the $CO_2$-methane mixture may be removed by passing the mixture through adsorbents and/or molecular sleves which periodically are regenerated or purged as is well known in the art.

Preferably, the $CO_2$-methane mixture to be treated pursuant to this invention for the production of substantially pure liquid $CO_2$ is the by-product or discard gas of the process for the recovery of methane-rich fuel gas from landfill gas as disclosed and claimed in U.S. Pat. No. 4,252,548 to Markbroiter and Weiss. Utilizing the discard gas of that patented process has important advantages including elimination of any dehydration step before the gas is fractionated, and minimizing the losses of methane and methanol inherent in the patented process when the discard gas thereof is not utilized pursuant to this invention. In short, there is synergism in combining the patented process for recovering methane-rich fuel gas from land-fill gas and the present invention of producing substantially pure liquid $CO_2$ from gas heretofore discharged into the atmosphere by the patented process.

BRIEF DESCRIPTION OF THE DRAWINGS

The further description of the invention will refer to the appended drawings of which.

DESCRIPTION OF PREFERRED EMBODIMENTS

Figure 1:
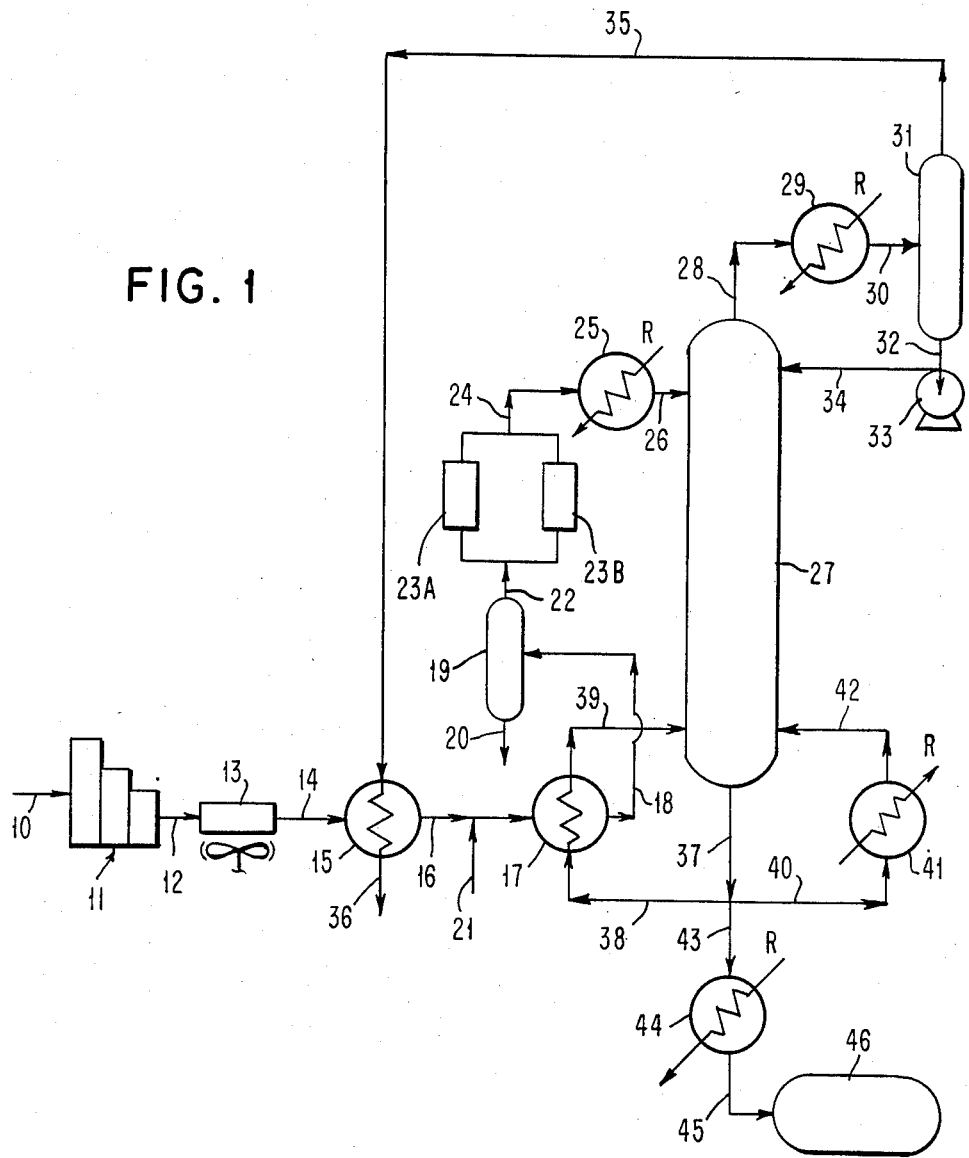
FIG. 1 is a diagram of a preferred system of the invention for recovering purified liquid $CO_2$ from a methane-$CO_2$ mixture.

Dry by-product gas containing at least 90% by volume $CO_2$ and at least 2% by volume methane is supplied by line 10 to compressor 11 and passed at a pressure in the range of about 225 to 275 psia by line 12 through air cooler 13. At slightly above ambient temperature the compressed gas flows through line 14, heat exchanger 15, line 16, heat exchanger 17 and line 18 into separator 19 wherein vapor is separated from condensate. For example, if the dry-by-product gas supplied by line 10 came from the processing of land-fill gas in accordance with U.S. Pat. No. 4,252,548, it would contain a small fractional percentage, say about 0.2%, of methanol. The major portion of the methanol in the gas would in such case drop out in separator 19 as condensate and discharge through line 20. On the other hand, if the by-product gas was not dry, methanol could be injected by line 21 into line 16 and the condensate removed from separator 19 by line 20 would be aqueous methanol.

The cold, dry gas passes from separator 19 through line 22 into either of two regenerable adsorbers 23A,23B wherein traces of other gases such as hydrogen sulfide and residual methanol are eliminated from the gas exiting therefrom into line 24. The now substantially pure mixture of $CO_2$ and methane flows from line 24, through heat exchanger 25 and line 26 into the upper portion of fractionation column 27. Regenerable adsorbers are well known in the art and there is no need to show the valves which alternately direct the flow of gas from line 22 to one of adsorbers 23A,23B while the other adsorber undergoes regeneration. As is also known, the choice of adsorbents and molecular sieves will depend upon the trace contaminants present in the gas. Refrigerant R flows through exchanger 25 to partly liquefy the gas passing through exchanger 25.

Vapor leaves fractionator 27 through line 28, passes through reflux condenser 29 and discharges via line 30 into separator 31. Reflux liquid drains from separator 31 through line 32 to pump 33 which injects the reflux liquid via line 34 into the upper portion of fractionator 27. Refrigerant R is used in condenser 29 to achieve the desired condensation of the vapor passing therethrough. The vapor top product of fractionation flows from separator 31 through line 35 to heat exchanger 15 wherein it chills the feed gas to be fractionated for the recovery of purified liquid $CO_2$. Thence, the vapor top product containing substantially all of the methane in the feed gas leaves through line 36. Column bottom liquid drains from fractionator 27 through line 37 and is divided into three streams. Two streams are warmed to provide the required reboiling at the bottom of column 27. The prime or main reboiler stream is heated by passage through line 38 and exchanger 17 before returning via line 39 to column 27 while the auxiliary or trim reboiler stream in line 40 gives up refrigeration in heat exchanger 41 to refrigerant R passed therethrough to recover refrigeration before returning via line 42 to column 27. The third liquid stream withdrawn from line 37 by line 43 passes through heat exchanger 44 wherein it is subcooled by refrigerant R. The subcooled liquid is transferred by line 45 as purified liquid $CO_2$ to storage tank 46. The liquid product reaching tank 46 corresponds to not less than 80% of the $CO_2$ content in the feed gas and has a purity of not less than 99.5% $CO_2$ on a molar basis.

Figure 2:
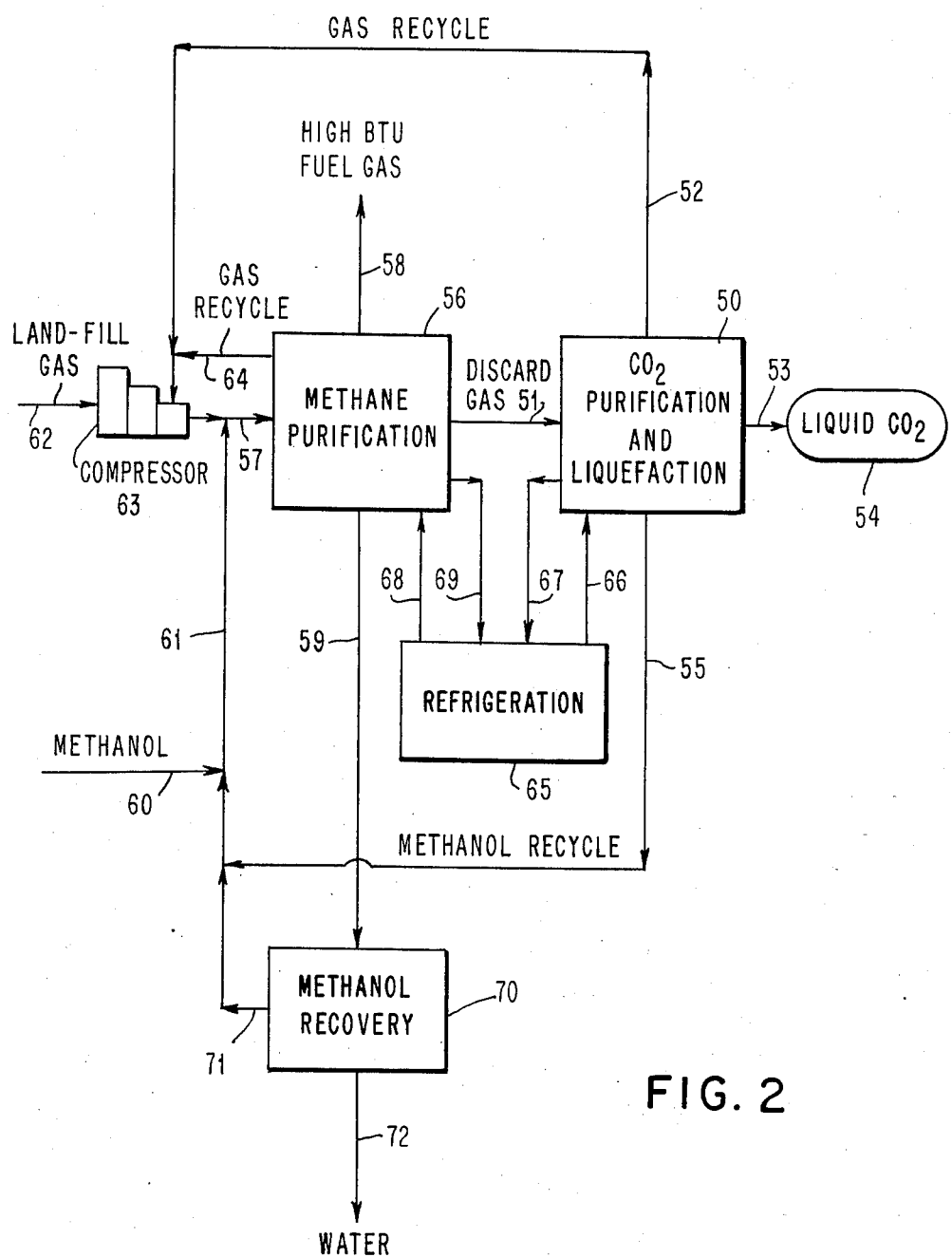
FIG. 2 is a diagram showing the system of the invention integrated with the system disclosed and claimed in U.S. Pat. No. 4,252,548.

In FIG. 2, the flow diagram of FIG. 1 is represented by block 50 with line 51 corresponding to line 10, line 52 corresponding to line 36, line 53 and tank 54 corresponding to line 45 and tank 46, and line 55 corresponding to line 20 of FIG. 1. Block 56 represents the flow diagram of U.S. Pat. No. 4,252,548 with line 57 corresponding to line 10 of that diagram, line 58 corresponding to line 22, line 59 corresponding to line 54, and line 51 corresponding to the total of lines 42, 48 and 53 of the patented process. Line 60 for supplying fresh make-up methanol to block 56 via line 61 corresponds to line 12 of the patented process. Land-fill gas supplied by line 62 is compressed by three-stage compressor 63 and thence introduced by line 57 into block 56 for the recovery of high BTU fuel gas in accordance with the process of U.S. Pat. No. 4,252,548. Inasmuch as gas leaving block 50 through line 52 is under pressure, it is introduced into the last stage of compressor 63 for recycling to methane purification block 56.

The only addition to the flow diagram of U.S. Pat. No. 4,252,548 is a preliminary partial pressure reduction or expansion of methanol containing absorbed gas in line 27 of that diagram to flash off gas (approximately 10% by volume of all the gas scrubbed by methanol)-before that methanol is passed through reducing valve 28. The flashed gas from the preliminary partial expansion is shown in FIG. 2 hereof as gas recycle via line 64 to the last stage of compressor 63. The addition of a preliminary partial pressure reduction to the patented process increases the $CO_2$ purity of the discard gas passing from block 56 through line 51 to block 50. Whereas the total discard gas from lines 42, 48 and 53 in the example of U.S. Pat. No. 4,252,548 had a $CO_2$ purity of 90.6% by volume, the aforesaid preliminary expansion resulting in flashing off some absorbed gas together with recycling the flashed gas to scrubbing with methanol causes the $CO_2$ purity of the total discard gas to increase to 96.0% by volume. Obviously, the higher the $CO_2$ purity of the discard gas flowing through line 51 to $CO_2$ purification and liquefaction block 50 is, the smaller are the equipment and power consumption required to produce high purity liquid $CO_2$.

Refrigeration block 65 highlights another unique benefit of integrating the process of FIG. 1 with the process of U.S. Pat. No. 4,252,548, namely, a single refrigerant from a common source at a common temperature is circulated to and from $CO_2$ purification block 50 via lines 66 and 67 to satisfy all the refrigeration requirements to produce purified liquid $CO_2$, and the same refrigerant at the same temperature is circulated to and from methane purification block 56 via lines 68 and 69, respectively, to satisfy all the refrigeration requirements to produce high BTU fuel gas. This is truly an accomplishment of economic significance.

When the process of U.S. Pat. No. 4,252,548 is carried out without the benefit of this invention, residual methanol in the discard gas is lest but in FIG. 2 it flows through line 51 to $CO_2$ purification block 50 wherein the major portion of the methanol in the discard gas is recovered as substantially pure methanol and returned via lines 55, 61 and 57 to methane purification block 56.

Although the aqueous methanol resulting from the dehydration of the land-fill gas in block 56 may be discarded via line 59, it is advisable to submit the aqueous methanol to rectification, represented in FIG. 2 as block 70, so that substantially anhydrous methanol is recovered and returned by lines 71, 51 and 57 to methane ourification block 56. The separated water is discharged from the rectification of block 70 via line 72.

At a glance, it is evident that substantially all of the land-fill gas entering compressor 63 of FIG. 2 is converted into the high BTU fuel gas of line 58 and the purified liquid $CO_2$ sent to tank 54. The moisture originally present in the land-fill gas becomes the water stream of line 72.

As an example of FIG. 1 of the invention, discard gas from the treatment of land-fill gas in accordance with U.S. Pat. No. 4,252,548 is supplied by line 10 to compressor 11 which raises the gas pressure to 262 psia. This gas is dry and contains, on a volume basis, 3.77% methane, 96.07% $CO_2$ and 0.16% methanol. Heat of compression is removed as the gas passes through air cooler 13 and enters heat exchanger 15 at a temperature of 100° F. Thence, the gas at 81° F. is chilled in exchanger 17 to a temperature of $-10°$ F. with the result that about 60% of the methanol in the gas condenses and is separated in separtor 19. The chilled gas flows from separator 19 alternately through adsorber 23A or 23B to capture the residual methanol and trace contaminants. The substantially pure mixture of methane and $CO_2$ is then further chilled in exchanger 25 to $-30°$ F. to effect liquefaction of about 95% of the mixture. The essentially liquid stream discharges from line 26 into the upper portion of column 27 maintained at a pressure of 250 psia. Vapor leaving column 27 through line 28 is chilled led in exchanger 29 to $-32°$ F. to produce reflux liquid which is returned from separator 31 by pump 33 to column 27 via line 34. The vapor leaving separator 31 through line 35 has a composition, on a volume basis, of about 25% methane and 75% $CO_2$. This gas at $-32°$ F. is used in exchanger 15 to cool the incoming discharge gas to 81° F. The warmed gas leaving exchanger 15 contains more than 99.9% of the methane in the incoming discard gas. Only a trace of methane remains in the liquid $CO_2$ withdrawn from column 27 by line 37. Part of the liquid withdrawn by line 37 passes through exchanger 17 and part passes through exchanger 41 to effect reboiling in the bottom of column 27 at a temperature of about $-15°$ F.

A third part of the liquid in line 37 flows through line 43 and exchanger 44 which subcools the liquid to $-20°$ F. The liquid $CO_2$ discharging into tank 46 has a molar purity of 99.998% and corresponds to 88.2% of the $CO_2$ present in the incoming discard gas.

The foregoing example makes it clear that a discard gas heretofore vented into the atmosphere is simply convered by the invention into valuable high-purity liquid $CO_2$ with an 88.2% recovery of $CO_2$, this achievement being all the more noteworthy because a single refrigerant supplies all the refrigeration required by the process at exchangers 25, 29 and 44.

As an example of the integrated system of FIG. 2, undried land-fill gas with approximately equal parts of methane and $CO_2$ in line 62 enters compressor 63 and discharges together with recycle gas from lines 52 and 64 at a pressure of 362 psia into line 57. Methanol from line 61 is injected into the compressed gas to dehydrate the gas as taught in U.S. Pat. No. 4,252,548. The resulting aqueous methanol leaves methane purification block 56 through line 59 and desirably is rectified in block 70 to recover substantially anhydrous methanol for return via lines 71 and 61 and reinjection into line 57.

Prior to the first stage of flashing of the partented process, the liquid methanol carrying absorbed $CO_2$ has its pressure dropped to about 122 psia (inlet pressure of the last stage of compressor 63) by passage through a reducing valve. The vapor from this preliminary pressure reduction corresponds to about 11% of the gas entering block 56 through line 57 and is recycled via line 64 to the last stage of compressor 63. The patented methane purification of block 56 delivers to line 58 a high BTU gas containing, on a volume basis, 98% methane and 2% $CO_2$. The gas previously discarded by the process of block 56 is passed by line 51 to $CO_2$ purification block 50.

Details of the discard gas fed to block 50 and of the $CO_2$ purification process have already been given in the example of FIG. 1. Over 88% of the $CO_2$ in the discard gas of line 51 is recovered as very pure liquid $CO_2$ sent to tank 54; however, as will be presently clear, the actual recovery of $CO_2$ as purified liquid is about 98% of the $CO_2$ in the land-fill gas fed by line 62. The remainder of the $CO_2$ and substantially all of the methane in the discard gas is recycled by line 52 to the third stage of compressor 63. While the recycle gas of line 52 is about 13.5% by volume of the discard gas of line 51, it corresponds to slightly less than 8% by volume of the land-fill gas supplied by line 62. It is evident in FIG. 2 that all of the methane in the land-fill gas is recovered as high BTU fuel gas except for a trace (not more than 20 parts per million) found in the purified liquid $CO_2$ which corresponds to all of the $CO_2$ in the land-fill gas except for a small percentage left in the high BTU fuel gas (98% methane and 2% $CO_2$ by volume). As previously stated, about 60% of the methanol in the discard gas of line 51 is recovered as dry methanol which is recycled via lines 55 and 61 for reuse in the dehydration of the land-fill gas flowing through line 57. In this example, the single refrigerant, DuPont's Freon-22, flows at the same temperature of $-36°$ F. from the refrigeration system of block 65 to satisfy all the refrigeration requirements of blocks 50 and 56.

Summarizing the synergism achieved by the example of the integrated system of FIG. 2, all of the methane in the land-fill gas of line 62 except for a trace in the liquid $CO_2$ product is recovered as high BTU fuel gas containing, on a volume basis, 98% methane and 2% $CO_2$. Except for the small amount of $CO_2$ in the high BTU fuel gas of line 58, all of the $CO_2$ in the land-fill gas of line 62 is recovered in tank 54 as liquid $CO_2$ with a molar purity of 99.998%. In short, the entire content of methane and $CO_2$ in the land-fill gas of line 62 is captured in the two valuable product streams, namely, high BTU fuel gas of line 58 and very pure liquid $CO_2$ of line 53. At the same time, 60% of the methanol that would have been lost without the process of block 50 is recovered and recycled for reuse in the process of block 56.

A feature of the invention is that the predetermined low temperature of the refrigerant used to satisfy all the refrigeration requirements of the processes of blocks 50 and 56 is in the range of about $-25°$ F. to $-40°$ F. Another feature is that the recycle gas of line 52 and the recycle gas of line 64 are usually at sufficient pressure that both need to be compressed in only the last stage of compressor 63. Both features enhance the economic attractiveness of the integrated operation of FIG. 2.

Many variations and modifications of the invention will be apparent to those skilled in the art without departing from the spirit or scope of the invention. For instance, while land-fill gas is an abundant example of gas rich in both methane and $CO_2$ gases from sewage digestion, coal gasification and synthesis gas generation are likewise rich in methane and $CO_2$ and thus can be processed pursuant to FIG. 2 for the recovery of high BTU fuel gas and purified liquid $CO_2$. As is well known, heat exchanger 17 can be replaced by a coil in the bottom of column 27 through which the compressed gas of line 16 would flow and then discharge via line 18 into separator 19. Similarly, heat exchanger 29 can be replaced by a coil in the top of column 27 through which refrigerant R would flow to produce reflux liquid within column 27; in such case, separator 31 and pump 33 would be eliminated. Accordingly, only such limitations should be imposed on the invention as are set forth in the appended claims.

What is claimed is:

1. The process of recovering liquid $CO_2$ with a molar purity of not less than 99.5% from a moisture-free by-product gas mixture of at least 90% by volume $CO_2$, at least 2% by volume methane and a fractional percentage of methanol, which comprises:
   compressing said gas mixture to a pressure in the range of about 225 to 275 psia,
   chilling the compressed gas mixture containing said methanol by heat exchange with liquid of the reboiler portion of a fractionation zone to condense a major portion of said methanol,
   separating the condensed methanol from the chilled compressed gas mixture,
   adsorbing trace contaminants and residual methanol from said chilled compressed gas mixture,
   further cooling the resulting substantially pure gas mixture of $CO_2$ and methane by heat exchange with a refrigerant at a predetermined low temperature to effect partial liquefaction of said pure gas mixture,
   discharging the partially liquefied gas mixture into the reflux portion of said fractionation zone,
   cooling vapor of the top of said fractionation zone by heat exchange with said refrigerant at said predetermined low temperature to provide reflux liquid for said reflux portion,
   withdrawing from the top of said fractionation zone a vapor stream containing substantially all of said methane in said by-product gas mixture and not more than 20% of the $CO_2$ in said by-product gas mixture, and
   withdrawing liquid $CO_2$ with a molar purity of not less than 99.5% from the bottom of said fractionation zone.

2. The process of claim 1 wherein the liquid $CO_2$ withdrawn from the bottom of the fractionation zone is subcooled by heat exchange with the same refrigerant at the same predetermined low temperature used to provide reflux liquid.

3. The process of claim 1 wherein the predetermined low temperature of the refrigerant is in the range of about $-25°$ F. to $-40°$ F.

4. The process of recovering liquid $CO_2$ with a molar purity of not less than 99.5% from a moisture-containing by-product gas mixture of at least 90% by volume $CO_2$ and at least 2% by volume methane, which comprises:

compressing said gas mixture to a pressure in the range of about 225 to 275 psia, injecting methanol into said gas mixture, chilling the compressed gas mixture containing said methanol by heat exchange with liquid of the reboiler portion of a fractionation zone to condense substantially all the moisture as an aqueous methanol condensate, separating said condensate from the chilled compressed gas mixture, adsorbing trace contaminants as well as residual methanol and moisture from said chilled compressed gas mixture, further cooling the resulting substantially pure gas mixture of $CO_2$ and methane by heat exchange with a refrigerant at a predetermined low temperature to effect partial liquefaction of said pure gas mixture, discharging the partially liquefied gas mixture into the reflux portion of said fractionation zone, cooling vapor of the top of said fractionation zone by heat exchange with said refrigerant at said predetermined low temperature to provide reflux liquid for said reflux portion, withdrawing from the top of said fractionation zone a vapor stream containing substantially all of said methane in said by-product gas mixture and not more than 20% of the $CO_2$ in said by-product gas mixture, and withdrawing liquid $CO_2$ with a molar purity of not less than 99.5% from the bottom of said fractionation zone.

5. The process of claim 4 wherein the liquid $CO_2$ withdrawn from the bottom of the fractionation zone is subcooled by heat exchange with the same refrigerant at the same predetermined low temperature used to provide reflux liquid.

6. The process of claim 4 wherein the predetermined low temperature of the refrigerant is in the range of about $-25°$ F. to $-40°$ F.

7. In the process for removing $CO_2$ from a feed gas containing at least 50% by volume methane and at least 5% by volume $CO_2$ comprising: compressing said gas; injecting methanol into said gas to dehydrate said gas by chilling said gas to condense all the moisture therein as aqueous methanol and by separating said aqueous methanol from the chilled dehydrated gas; scrubbing said chilled dehydrated gas at a pressure of about 200 to 600 psia with cold recycled methanol supplied at a temperature of about $-40°$ F. to $-70°$ F. and containing not more than about 2% on a molar basis of absorbed $CO_2$; recovering the scrubbed gas containing not more than about 2.5% by volume $CO_2$ as high BTU fuel gas product; chilling the methanol with absorbed $CO_2$ withdrawn from said scrubbing by heat exchange with a refrigerant at a predetermined low temperature; and passing the chilled methanol through a pressure-reduction flashing separation of $CO_2$-rich gas from said methanol and at least two heat flashing separations of $CO_2$-rich gas from said methanol which is then recycled to said scrubbing; the improvement which comprises:

compressing all of the flashed $CO_2$-rich gas containing at least 90% by volume $CO_2$, at least 2% by volume methane and a fractional percentage of methanol to a pressure in the range of about 225 to 275 pisa, chilling the compressed $CO_2$-rich gas containing said methanol by heat exchange with liquid of the reboiler portion of a fractiontion zone to condense a major portion of said methanol, separating the condensed methanol from the chilled compressed $CO_2$-rich gas, adsorbing trace contaminants and residual methanol from said chilled compressed $CO_2$-rich gas, further cooling the resulting substantially pure gas mixture of $CO_2$ and methane by heat exchange with said refrigerant at said predetermined low temperature to effect partial liquefaction of said pure gas mixture, discharging the partially liquefied gas mixture into the reflux portion of said fractionation zone, cooling vapor of the top of said fractionation zone by heat exchange with said refrigerant at said predetermined low temperature to provide reflux liquid for said reflux portion, withdrawing from the top of said fractionation zone a vapor stream containing substantially all of said methane in said flashed $CO_2$-rich gas and not more than 20% of the $CO_2$ in said flashed $CO_2$-rich gas, and recycling said vapor stream for compression with said feed gas; and withdrawing liquid $CO_2$ with a molar purity of not less than 99.5% from the bottom of said fractionation zone.

8. The improvement of claim 7 wherein the condensed methanol separated from the chilled compressed $CO_2$-rich gas is recycled for injection into the compressed feed gas for the dehydration thereof.

9. The improvement of claim 7 wherein the liquid $CO_2$ withdrawn from the bottom of the fractionation zone is subcooled by heat exchange with the same refrigerant at the same predetermined low temperature used to provide reflux liquid.

10. The improvement of claim 7 wherein the predetermined low temperature of the refrigerant is in the range of about $-25°$ F. to $-40°$ F.

11. The improvement of claim 7 wherein prior to passing the chilled methanol with absorbed $CO_2$ through the pressure-reduction flashing separation of $CO_2$-rich gas from said chilled methanol, said chilled methanol with absorbed $CO_2$ is passed through a preliminary partial pressure-reduction flashing separation of $CO_2$-rich gas which is recycled for scrubbing with cold methanol.

12. The improvement of claim 11 wherein the $CO_2$-rich gas from the preliminary partial pressure-reduction flashing separation amounts to about 10% by volume of all the gas scrubbed with cold methanol.

13. The improvement of claim 11 wherein the liquid $CO_2$ withdrawn from the bottom of the fractionation zone is subcooled by heat exchange with the same refrigerant at the same predetermined low temperature used to provide reflux liquid.

14. The improvement of claim 13 wherein the predetermined low temperature of the refrigerant is in the range of about $-25°$ F. to $-40°$ F.

* * * * *